United States Patent [19]
Perkins

[11] 3,828,924
[45] Aug. 13, 1974

[54] COILED STRIP OF COLLATED FASTENERS
[75] Inventor: Garry R. Perkins, Palatine, Ill.
[73] Assignee: Spotnails, Inc., Rolling Meadows, Ill.
[22] Filed: Nov. 20, 1972
[21] Appl. No.: 307,972

[52] U.S. Cl. ............................................. 206/343
[51] Int. Cl. ........................ B65d 83/02, B65d 85/24
[58] Field of Search. 206/56 DF, 56A, 56AB, 46 H, 206/DIG. 29

[56] References Cited
UNITED STATES PATENTS
2,224,461  12/1940  Obstfeld ........................ 206/56 DF
2,743,445  5/1956  Lerner ........................... 206/56 DF
2,867,807  1/1959  Anstett .......................... 206/56 DF
3,137,858  6/1964  Powers .......................... 206/56 DF Primary Examiner—William T. Dixson, Jr.

[57] ABSTRACT

A coiled strip of collated fasteners is provided wherein the fasteners thereof are arranged in abutting side-by-side relation. Corresponding portions of the fastener shanks are interconnected. A continuous flexible plastic film is applied to exposed portions of the fasteners to effect collating thereof.

4 Claims, 5 Drawing Figures

PATENTED AUG 13 1974 3,828,924
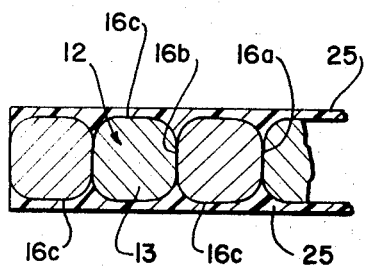
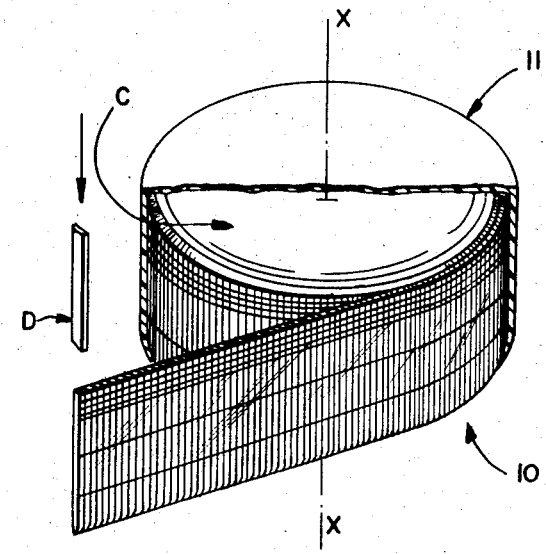
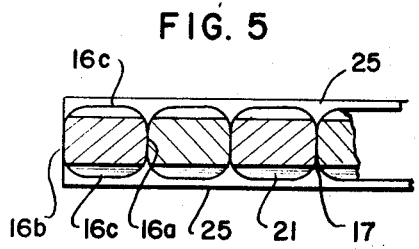
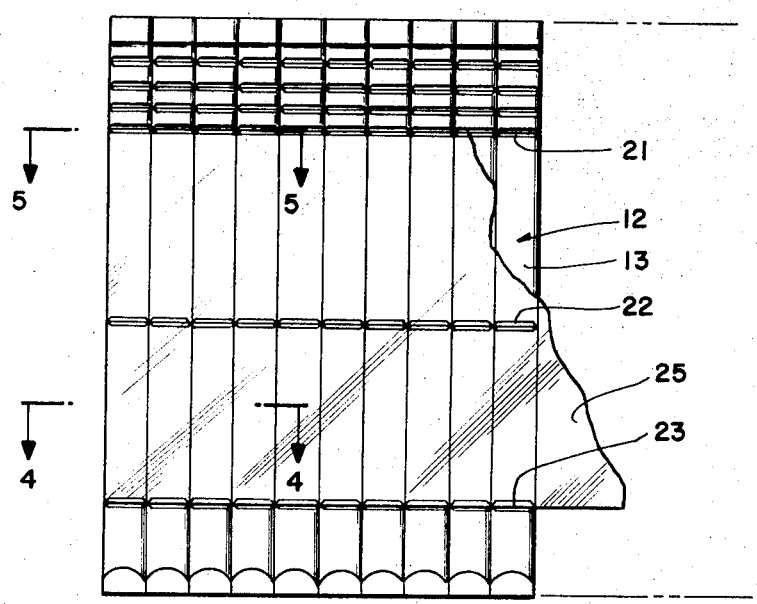
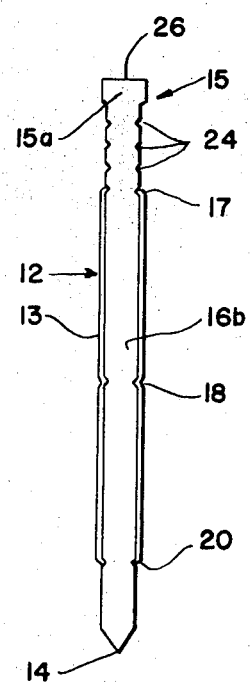

COILED STRIP OF COLLATED FASTENERS

BACKGROUND OF THE INVENTION

Various collated fasteners have heretofore been provided; however, because of certain design characteristics they have been beset with one or more of the following shortcomings: (a) the flexibility of the strip was limited and frequently resulted in accidental separation or breaking of the strip; (b) the interconnection between the adjacent fasteners of the strip was such that substantial frictional drag was encountered when the fastener was severed from the strip and driven into a workpiece; (c) the plastic film applied to the exposed portions of adjacent fastener was ineffective in enhancing the bond between the workpiece and the driven fastener and also frequently fouled the driver blade so as to adversely affect its operation; and (d) the fastener was not color coated to the exposed surface of the workpiece and thus, detracted from the appearance of the workpiece once the fastener was driven in place.

SUMMARY OF THE INVENTION

Thus, it is an object of this invention to provide a coiled strip of collated fasteners which avoids the aforenoted shortcomings of the prior structures.

It is a further object of the invention to provide a coiled strip of collated fasteners which is capable of withstanding the repeated impacts which occur during normal operation of pneumatically powered driving tool.

It is a still further object of the invention to provide a strip of collated fasteners which may be formed into a tightly wound, compact coil.

It is a still further object of the invention to provide a coiled strip of collated fasteners wherein the head ends of the fasteners are color coated to match the exposed surface of the workpiece into which the fasteners are driven.

It is a still further object of the invention to provide a coiled strip of collated fasteners which may be packaged in a cartridge for ready loading in a high speed powered driving tool.

Further and additional objects will appear from the description, accompanying drawing and appended claims.

In accordance with one embodiment of the invention, a coiled strip of collated fasteners is provided wherein the fasteners thereof are of like construction and are arranged in abutting side-by-side relation. Each fastener has an elongated shank having opposite elongated facetted portions. The facetted shank portions of adjacent fasteners are disposed in abutting relation and corresponding longitudinally spaced segments of the abutting facetted portions are interconnected and form elongated gripper marks disposed transversely of the fastener shanks and extending longitudinally of the strip. A continuous flexible plastic film is applied to exposed portions of the fasteners and effects collating thereof.

DESCRIPTION

For a more complete understanding of the invention, reference should be made to the drawing wherein:

FIG. 1 is a fragmentary perspective view of the improved coil partially unwound and shown disposed within a cartridge and with a substantial portion of the latter removed; the endmost fastener of the strip is shown vertically aligned with a reciprocating driver blade.

FIG. 2 is an enlarged fragmentary side elevational view of a portion of the strip of FIG. 1.

FIG. 3 is an enlarged left-hand view of the endmost fastener of FIG. 2.

FIGS. 4 and 5 are enlarged sectional views taken along lines 4—4 and 5—5, respectively, of FIG. 2.

Referring now to the drawing and more particularly to FIG. 1, one form of the improved coiled strip 10 of collated fasteners is shown in partially unwound condition. The axis X—X of the coil C is illustrated in FIG. 1 as being in spaced parallel relation with respect to the direction of movement of a driver blade D, the latter forming a component part of a pneumatically powered tool, not shown. The coil C is preferably packaged within a cartridge 11 of a type similar to that illustrated in Lerner U.S. Pat. No. 3,133,714.

Strip 10, in the illustrated embodiment, includes a plurality of fasteners (brads) 12 which are of like construction and are arranged in abutting side-by-side relation. Other types of fasteners may be utilized to form the strip, if desired.

As seen in FIGS. 2 and 3, each fastener has an elongated shank 13 having the leading end 14 thereof shaped so as to facilitate penetration of the driven fastener into the workpiece, not shown. The trailing end of the shank is provided with a head 15 to be described more fully hereinafter. Opposite portions of the shank exterior are provided with elongated facets 16a and 16b. Each facet extends the full length of the shank. When the fasteners are collated to form the strip, the facet 16a of one fastener is in abutting engagement with the facet 16b of the adjacent fastener. The shanks of adjacent fasteners of a strip are interconnected at predetermined longitudinally spaced positions 17, 18 and 20 along the shank. The interconnection is effected by upsetting or distorting the shank material at such location so as to fuse together the material of the adjacent fasteners. A groove is formed on the shank exterior to effect the desired interconnection subsequent to the fasteners being arranged in abutting side-by-side relation. Each groove is disposed transversely of the shank axis and corresponding grooves of the adjacent fasteners form elongated gripper marks 21, 22 and 23 which are in spaced parallel relation with respect to one another and extend longitudinally the full length of the strip. Because the adjacent fastener shanks are interconnected at positions 17, 18 and 20, only a minimal amount of frictional drag is encountered when the endmost fastener is separated from the strip by the driver blade D of the powered tool, see FIG. 5.

Also formed in the shank periphery, adjacent the head end 15, are a plurality of nicks or notches 24 which serve to enhance the frictional bond between the workpiece and the fastener shank when the fastener has been fully driven into the workpiece.

The head 15 formed at the trailing end of each shank 13 is enlarged, but has the portions 15a thereof which are aligned with the facets 16a and b in substantial coplanar relation therewith. Thus, the heads in nowise interfere with the fasteners being arranged in abutting side-by-side relation to form the strip or their being separated from the strip by the driver blade.

Besides the interconnection of the fastener shanks by teh gripper marks 21, 22 and 23, as previously described, the fasteners are retained in collated relation by a continuous, flexible, plastic film 25 applied to the opposite exposed portions 16c of the fastener shanks; such portions being those separating the shank facets 16a and b, see FIG. 4. The film may be sprayed, brushed or otherwise applied to the fasteners in an area which is substantially delimited by gripper marks 21 and 23. A preferred film material is a combination of synthetic SBR rubber with an acrylic nitrocellulose cement. Such a film material has good adhesion characteristics and is readily flexible without rupturing, thereby permitting the strip to be easily wound into a compact coil. Other film materials having similar characteristics may be utilized, if desired. Once the coil is formed, it is normally packaged within the cartridge 11. The cartridge is capable of being removably mounted on the housing, not shown, of a powered driving tool. In the illustrated embodiment, the axis of the coil is disposed substantially parallel to the direction of movement of the driver blade.

In order to render the head of a fastener inconspicuous, once the fastener has been driven into the workpiece, the upper surface of the fastener is color coated at 26 so that said coating will blend into the coloring of the exposed surface of the workpiece surrounding the head of the driven fastener. Said coating must have sufficient flex and impact strength, as well as adhesion so that said coating will not be knocked off or chipped when the head of the fastener is struck by the end of the driver blade. A suitable coating material for this purpose would be any vinyl ethylene terpolyer, such as AIRFLEX 720.

As aforementioned, the improved coiled strip has been described with relation to brads; however, if desired, the strip could be formed of collated pins, nails, etc., wherein the shanks thereof are facetted and interconnected to one another by gripper marks of the type heretofore described.

Thus, it will be seen that a coiled strip has been provided which is capable of being readily flexed without accidental fracturing occurring; produces a minimal amount of drag friction when the endmost fastener is being severed from the strip by a driver blade; and the exposed end of the fastener can be color coated so as to make the end of the fastener inconspicuuos when it is driven into a workpiece.

I claim:

1. A coiled strip of collated fasteners comprising a plurality of elongated fasteners of like construction arranged in abutting side-by-side relation, and a continuous flexible plastic film applied to exposed shank portions of said fasteners; each fastener having an elongated shank with opposite elongated facetted portions, a facetted portion of one shank being in abutting engagement with a facetted portion of an adjacent shank, longitudinally spaced portions of each fastener shank being upset and fused to laterally aligned corresponding shank portions of adjacent fasteners and forming a plurality of elongated, narrow, indented gripper marks extending longitudinally of the strip.

2. The coiled strip of claim 1 wherein at least three gripper marks are formed in each fastener shank, and said marks are spaced uniformly from one another and the end marks are spaced uniformly from the opposite ends of said shank.

3. The coiled strip of claim 1 wherein said plastic film includes a synthetic SBR rubber in combination with acrylic nitrocellulose cement.

4. The coiled strip of claim 3 wherein each fastener is provided with a color coated head end having segments of the periphery thereof in substantially coplanar relation with the facetted portions of the fastener shank; the color coated head end of each fastener, when the latter has been driven into a workpiece surface, being substantially camouflaged with the surrounding workpiece surface.

* * * * *

UNITED STATES PATENT OFFICE
CERTIFICATE OF CORRECTION

Patent No. 3,828,924　　　　　　　　　Dated August 13, 1974

Inventor(s) Garry R. Perkins

It is certified that error appears in the above-identified patent and that said Letters Patent are hereby corrected as shown below:

Column 2, line 11, "a" should be inserted before partially

Column 2, " 66, "teh" should be --the--

Column 3, " 30, "terpolyer" should be --terpolymer--

Column 4, " 6, "inconspicuuos" should be --inconspicuous--

Signed and sealed this 5th day of November 1974.

(SEAL)
Attest:

McCOY M. GIBSON JR.　　　　　　　　　C. MARSHALL DANN
Attesting Officer　　　　　　　　　　Commissioner of Patents